United States Patent [19]

Wada et al.

[11] 4,393,981
[45] Jul. 19, 1983

[54] APPARATUS FOR SUPPLYING A PREDETERMINED NUMBER OF PISTON RINGS TO A WORK STATION

[75] Inventors: Masahiko Wada; Masato Ueki, both of Kashiwazaki, Japan

[73] Assignee: Kabushiki Kaisha Riken, Tokyo, Japan

[21] Appl. No.: 263,253

[22] Filed: May 13, 1981

[30] Foreign Application Priority Data

May 19, 1980 [JP] Japan .............................. 55-68417[U]

[51] Int. Cl.³ ............................................ B65G 59/00
[52] U.S. Cl. .................................... 221/289; 221/296; 414/27
[58] Field of Search ................. 29/527.4, 269; 51/157; 134/83; 221/176, 178, 241, 264, 289, 276, 295, 296, 299, 312 A; 414/27

[56] References Cited

U.S. PATENT DOCUMENTS

| | | | |
|---|---|---|---|
| 3,082,866 | 3/1963 | Maude | 414/27 |
| 3,133,341 | 5/1964 | Marien | 29/156.63 |
| 3,134,168 | 5/1964 | Erdmann | 221/312 A X |
| 3,137,932 | 6/1964 | Erdmann | 221/312 A |
| 3,296,747 | 1/1967 | Philippsen et al. | 51/161 X |
| 3,572,522 | 3/1971 | Nesterok | 414/27 |

Primary Examiner—Joseph J. Rolla
Assistant Examiner—Jan Koniarek
Attorney, Agent, or Firm—Finnegan, Henderson, Farabow, Garrett & Dunner

[57] ABSTRACT

Apparatus for supplying a predetermined number of piston rings to a work station including a vertically movable slide plate interposed between a charge-side chute and a discharge-side chute. Both the chutes have inclined grooves formed on side surfaces thereof for suspending the piston rings for sliding movement by gravity and the slide plate also has grooves adapted to receive a set number of rings from the charge-side chute at one position and to discharge the same from the slide plate to the discharge-side chute at another position. An adjuster is provided for controlling the number of the piston rings to be fed to the slide plate and discharged to the discharge side chute.

5 Claims, 3 Drawing Figures

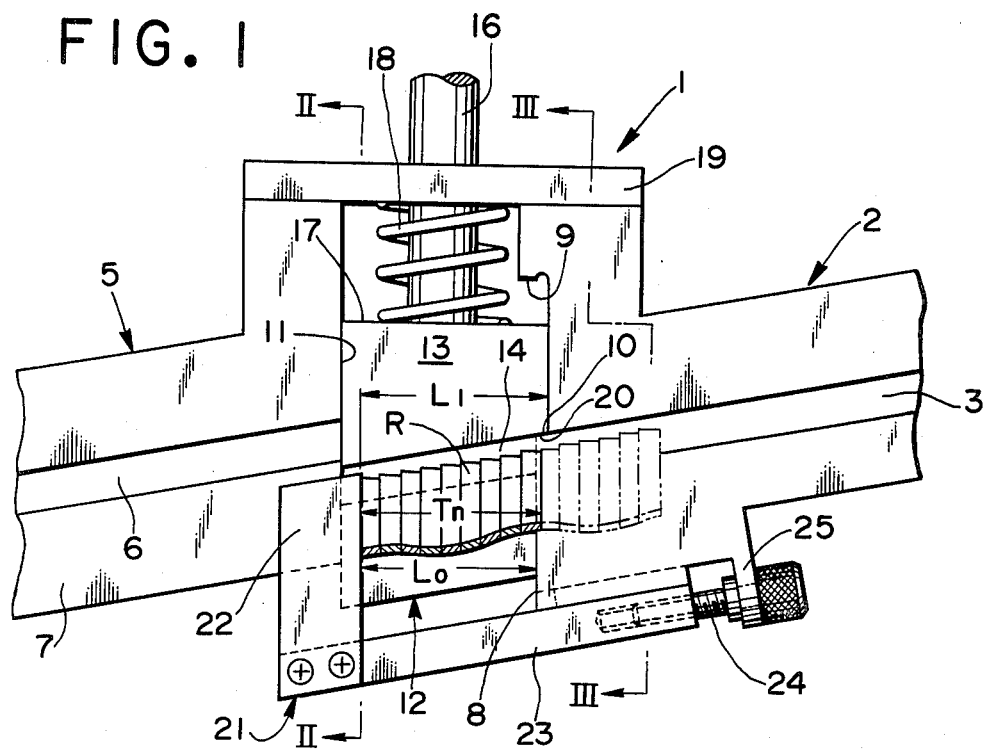
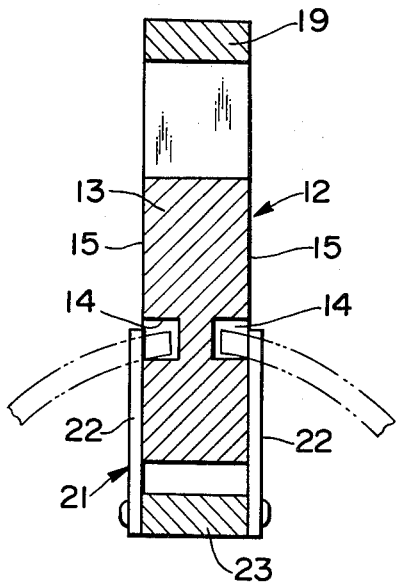
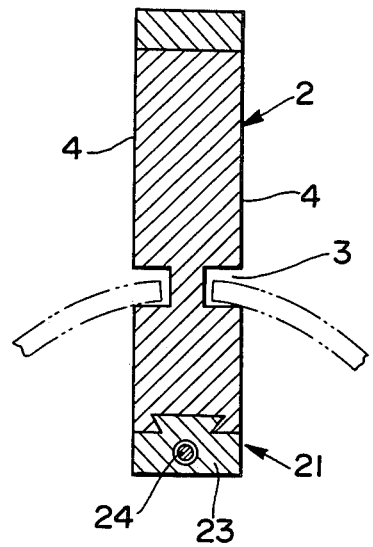

APPARATUS FOR SUPPLYING A PREDETERMINED NUMBER OF PISTON RINGS TO A WORK STATION

The present invention relates to an apparatus for supplying a predetermined number of split rings to a work station and more particularly to an apparatus for intermittently supplying a predetermined number of split rings from one station to another other station.

In the manufacture of piston rings for internal combustion engines, the rings pass through work stations of machining, honing or lapping and/or surface treatment including the step of coating the peripheral outer surfaces of the piston rings with chromium to give them a fine finish. For these operations, a plurality of piston or split rings are stacked or racked upon an arbor (for example, see U.S. Pat. Nos. 3,296,747 and 3,133,341). The arbor is usually provided with the predetermined number of the piston rings to be worked.

Conventional means for transferring the piston rings from one station to another station, which means was used in a factory of the assignee of the present invention, included inclined chutes. The chutes are provided with inclined straight grooves on opposite side surfaces and the end portions of the confronting ends of the split rings are slidable placed in and suspended from the grooves, thus permitting the piston rings to slide by gravity in the grooves in a downward direction. When a certain number of the piston rings was to be supplied to the arbor for holding the same in stacked relationship the operator had to manually count out the number of rings at the point where they were discharged from the chute. This represented a time-consuming operation and increased the cost for manufacturing the piston rings.

Accordingly, it is a primary object of the present invention to provide an apparatus for supplying a predetermined number of split piston rings to a work station including ring conveying means adapted to suspend piston rings therefrom and having a charge-side chute and a discharge-side chute and further including slider means interposed between opposite side faces of the chutes and adapted to select the predetermined number of the rings from the charge-side chute and supply the same to the discharge-side chute.

Another object of the present invention is to provide an apparatus for supplying a predetermined number of piston rings including a charge-side chute having grooves thereon, a discharge-side chute having grooves which are parallel to the first-mentioned grooves but not in co-linear relationship with each other, and slider means having grooves thereon which is in aligmnent with the first-mentioned grooves when moved to a downward position and in alignment with the second-mentioned grooves when moved to a upward position.

A further object of the present invention is to provide an apparatus for supplying a predetermined number of piston rings including adjuster means for determining the number of piston rings to be supplied to discharge-side chute.

Other objects and advantages of the present invention will be more apparent from the following description taken in connection with the accompanying drawings, in which:

FIG. 1 is a side view of one embodiment according to the present invention;

FIG. 2 is a cross-section taken along the line II—II in FIGS. 1; and

FIG. 3 is a cross-section taken along the line III—III in FIG. 1.

Referring now to FIG. 1, there is shown an apparatus 1 for supplying a predetermined number of piston rings to work station that includes a charge-side chute 2 having grooves 3 on side surfaces 4 (see FIG. 3) and a discharge-side chute 5 having grooves 6 on side surfaces 7 thereof. Chutes 2 and 5 are spaced from one another but are in a flush-vertical plane. The inclined straight grooves 3 and 6 on the charge-side chute 2 and the discharge-side chute 5, respectively, extend in the longitudinal direction thereof and are parallel to each other but are not aligned with each other. The end face 8 of the charge-side chute 2 has a pair of spaced shoulders 9, 10. The front face 11 of the discharge-side chute 5 is a flat surface.

A slider means 12 for transferring the rings from chute 2 to chute 5 is interposed between both the faces 8, 11 of the chutes 2, 5 and has a slide plate 13 having grooves 14 on side surfaces 15 thereof. A rod 16 is connected at one end to a top surface 17 of the slide plate 13 and cooperates at the other end with suitable drive means (not shown). A spring 18 is disposed between the top surface 17 of the slide plate 13 and a member 19 connecting both chutes 2, 5 to urge the slide plate 13 downward. The slide plate 13 is provided on one side face with a stepped portion to form a land 20 which seats on lower shoulder 10 of charge-side chute 2 when the slide plate 13 moves to a downward position under the biasing force of spring 18. When the slide plate 13 is in the downward position, as shown in FIG. 1, the grooves 14 on the slide plate 13 are aligned with the grooves 3 on the charge-side chute 2. When the slide plate 13 is in the upward position after being moved upwardly by the drive means (not shown), the top surface 17 of the slide plate 13 abuts the upper shoulder 9 of charge-side chute 2 to restrict further the vertical movement of slide plate 13 and the grooves 14 on the slide plate 13 are then aligned with the grooves 6 of the discharge-side chute 5.

The apparatus further includes adjuster means 21 for setting the number of piston rings R to be transferred from chute 2 to chute 5, which has stopper plates 22 located along the side surfaces 7 of the discharge-side chute 5. The stopper plates 22 are secured to one end of an adjuster plate 23 which is mounted for sliding movement in a dovetail groove on the lower side of charge side chute 2. A bolt 24 extends through a projection 25 on chute 2 and is threaded into the opposite end adjuster plate 23. Thus, the position of the stopper plates 22 along the side surfaces 7 of the discharge-side chute 5 can be adjusted by rotation of the bolt 24.

In operation, the slider means 12 is moved to its downward position and piston rings R are loaded on the charge-side chute 2 in such a manner that the end portions of the rings near the gap defined by the confronting end faces are placed in the grooves 3 on the chute. The rings thus suspended from the charge-side chute 2 slide downward under the face of gravity until the first piston ring abuted the stopper plates 22 of the adjuster means. The chute is continuously loaded with rings until a plurality of the rings R are held on the slider means 12 and the charge-side chute 2 in face to face relationship. When the slide plate 13 is raised against the biasing force of the spring 18 by means of the suitable drive means (not shown), the piston rings R located in the space Lo between the stopper plates 22 and the end face 8 of the charge-side chute move upwardly together with the slide plate 13 until the grooves 14 in the plate are aligned with the grooves 6 so that these rings may slide into chute 5 under the force of gravity. The number of the piston rings to be discharged is predetermined according to the dimensions of Lo and a change in the dimensions of Lo can easily be made by operation of the adjuster means 21, that is, by advance or retraction of the stopper plates 22. When a decreased number of the piston rings R is to be discharged, the stopper plates 22 are advanced rightward to shorten the dimensions of Lo and when an increased number of the piston rings R is to be discharged the stopper plates 22 are moved leftward to lengthen the dimensions of Lo. Thus, a predetermined number of the piston rings R can be intermittently supplied to the discharge-side chute 5 simply by raising the slide plate 13. After discharge of the piston rings, the slider means 12 is lowered to the illustrated downward position where the grooves 14 on the slide plate 13 are again aligned with the grooves 3 on the charge-side chute 2 and the next batch of rings are loaded on the slide plate 13. Tn is the distance between the forward face of the first piston ring resting against stopper plates 22 and the rearward face of the last piston in the batch to be fed to the discharge chute and Ll is the distance between the stopper plates and the recessed portion of forward face 8 of the chute 2 above shoulder 10. To insure smooth operation of the device, the dimentions of Ll, Tn and Lo should have relationship of $Lo < Tn < Ll$.

In the event that the axial thickness of the piston rings to be charged changes, the stopper plates 22 can be moved so as to change the dimensions of Lo and the number of the piston rings placed in the slider means 12.

It will be seen that repetition of the upward and downward movement of the slider means makes it possible to intermittently supply a predetermined number of the piston rings from one chute to the other chute. Further, it will be noted that a change in the dimensions of Lo by operation of the adjuster means permits the operations to readily change the number of the piston rings to be discharged by the slider means for feeding to the next work station.

We claim:

1. Apparatus for supplying a predetermined number of split piston rings to a work station comprising:
   (a) a charge-side chute having a pair of downwardly inclined parallel grooves on opposite side surfaces thereof for holding a supply of rings, said grooves receiving the end portions of the confronting end faces forming the gap of the rings whereby the rings are suspended from and slide down the grooves by gravity;
   (b) a discharge-side chute having a pair of similarly inclined parallel grooves on opposite side surfaces thereof, said discharge-side chute being spaced from the charge side chute with its grooves extending in a longitudinal direction parallel to but out of alignment with the grooves of the charge-side chute;
   (c) slider means for transferring a predetermined number of rings from the charge chute to the discharge chute interposed between the chutes, said means including a slide plate having inclined parallel grooves on opposite side surfaces thereof, said plate being vertically movable between a position where the grooves of said slide plate are in alignment with the grooves of said charge-side chute to receive rings from the charge chute and a position where the grooves of said slide plate are in alignment with the grooves of said discharge-side chute to transfer the rings from the slide plate to the discharge chute; and
   (d) adjuster means for controlling the number of rings received by the slider means and transferred to the discharge chute.

2. The apparatus of claim 1, in which the slider means is normally urged by a spring to a downward position where the grooves of said charge-side chute are aligned with the grooves of said slide plate and said adjuster means has stopper plates slidable along the opposite side surfaces of said discharge-side chute to control the number of rings to be received by said slide plate.

3. The apparatus of claim 2, wherein the stopper plates of the adjuster means are secured to an adjuster plate which is mounted for sliding movement on said charge-side chute in a dovetail groove.

4. The apparatus of claim 3, in which said charge-side chute is provided at its end face adjacent the discharge-side chute with a pair of shoulders to limit the upward and downward movements of said slide plate, said slide plate having a land adapted to seat on the lower of the pair of shoulders when the slide plate is in its downward position.

5. The apparatus according to claim 4, wherein the lower shoulder of said charge-side chute is sized such that the first ring on said charge-side chute is prevented from being pulled upward by the last ring on said slide plate as it is raised upward.

* * * * *